UNITED STATES PATENT OFFICE.

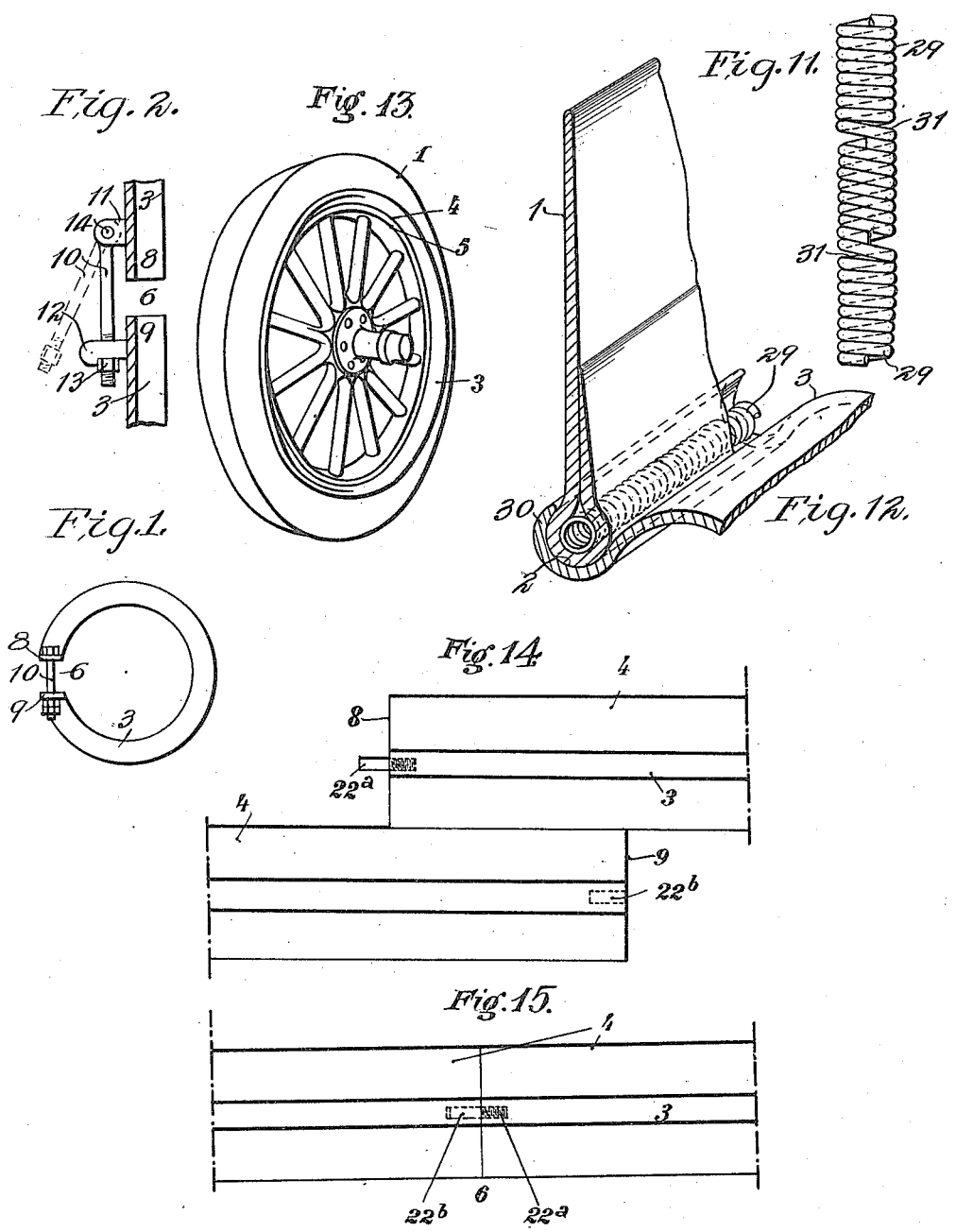

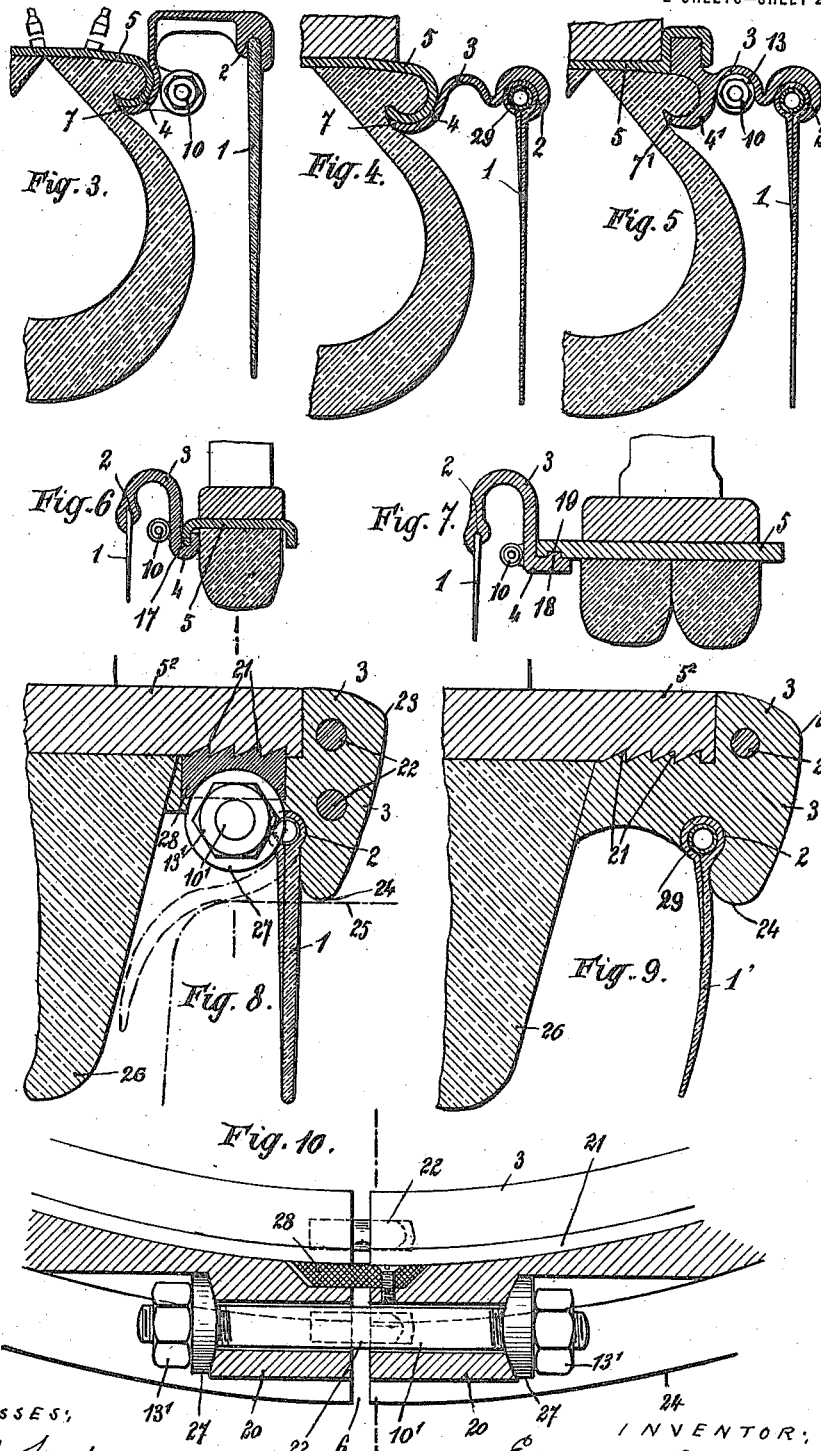

EDOUARD BRUNSWICK, OF PARIS, FRANCE.

MUD-GUARD FOR VEHICLE-WHEELS.

1,161,288.        Specification of Letters Patent.        Patented Nov. 23, 1915.

Application filed December 20, 1913.   Serial No. 807,898.

*To all whom it may concern:*

Be it known that I, EDOUARD BRUNSWICK, a citizen of the Republic of France, residing at 44 Faubourg du Temple, Paris, Seine, France, mechanical engineer, have invented new and useful Improvements in Mud-Guards for Vehicle-Wheels, of which the following is a specification.

This invention relates to annular disk-shaped mud-guards applicable to vehicle wheels and intended to prevent lateral splashing of mud by the wheels.

It is the object of the invention to provide improved means for mounting such mud-guards to the wheel rims, by means of a splitted metal ring simultaneously hooked and tightened on the rim, and improved means of retaining elastically the mud-guard in its support or ring.

The invention is illustrated in the accompanying drawings wherein:—

Figure 1 is an elevation showing one form of ring for carrying the mud-guard. Fig. 2 is a sectional detail view showing a method of tightening the said ring on the rim. Figs. 3 and 4 are cross sections of pneumatic tired wheels showing the application of the mud-guard to fixed rims. Fig. 5 is a similar section showing its application to a detachable rim. Figs. 6 to 9 are corresponding sectional views showing the application of the mud-guard to rims for solid tires. Fig. 10 is a longitudinal sectional view of the joint of the rim shown in Fig. 8. Fig. 11 is a detail view of the coiled spring which may be used for retaining the mud guard elastically in place showing how its ends are coiled together and Fig. 12 is a perspective view of a portion of the corresponding mud-guard. Fig. 13 is a perspective view of a wheel fitted with a mud-guard, and Figs. 14 and 15 are detail views of a modified construction of the metal ring.

The annular disk-like mud-guard 1, which may be made of rubber with embedded fabric, or of leather or the like, may be retained in the circumferential groove 2 of its carrying metal ring 3 either by its own elasticity alone (Figs. 3, 6 and 7) or by the use of an extensible rod or coiled spring 29 (Figs. 4, 5, 8, 9, 11 and 12). The ring 3 has an annular hook or flange 4 formed to hook over edge of the wheel rim 5 (Figs. 3 to 7). The ring 3, Fig. 1, is split at 6, and its ends 8 and 9 are drawn together to tighten the hooked flange 4 on the rim 5, by means of a bolt 10. The point 7 of the flange 4 (Figs. 3 and 4) is thus drawn into place between the tire and the rim.

In the construction shown in Fig. 2, the bolt 10 is pivoted at 14 in a lug 11 on the end 8 of the ring 3, so that the bolt can turn as shown by the dotted lines. Its other end passes between two lugs or cheeks 12 on the end 9 of the ring 3, and is secured and tightened by a nut 13 engaging under overhanging edges on the cheeks 12. The rings 3 if they are rigid can be made up of two or any number of sections joined together by bolts as in Figs. 1 and 2. The edge of the ring 3 outside the groove 2 projects downward slightly farther than the inner edge, in order that it may strike first an obstruction or the curb for instance on which the mud-guard would run. In this manner the mud-guard is protected from damage as it can bend inward into the dot and dash position as shown in Fig. 8.

In Fig. 5 the ring 3 with its hook $4^1$ forms the second portion of the detachable rim for holding the tire in place, and it is suspended from the rim 5 by means of its rib 15 engaging with a corresponding groove in the rim portion 16 and tightened by the bolt 10 as hereinbefore described.

In Fig. 6 when the metal rim 5 of the wheel is of channel (⊓) shape, the ring 3 hooks behind the edge 17 of the rim and is of such section that the groove 2 is sufficiently high above the ground to leave room for the guard.

In Fig. 7 the ring 3 clamps by a rib 18 in a groove 19 of the flat rim 5.

In Figs. 8 and 10 the bolt 10′ is provided with two nuts 13′ which rest on the bearing surfaces 20 at the ends of the ring 3. The section of the ring 3 is so chosen that it surrounds the rim $5^2$ of the wheel on which it is at the same time fixed by being circumferentially clamped and tightened thereon, the clamping being effected by saw teeth 21, provided in the ring 3 (Fig. 9) which engage with corresponding teeth in the rim $5^2$. The ends of the ring 3 are brought into alinement by two bolts 22 which are fixed into one end of the ring and project over the opening 6 into corresponding borings in the other end of the ring, so that the assemblage of the rim and ring is considerably facilitated and the two ends of the ring are drawn together correctly. The outer side 23 of the ring 3, which may strike the curb, is strengthened, and thus protects the mudguard 1 and the rim 5² from shocks. In addition to this the projecting edge 24 of the ring 3 protects the mudguard 1 and the rim 5² when the wheel runs upon a low curb. The mud-guard in this case bends toward the rubber tire 26, as in Fig. 8, and the rim 5² is not liable to become damaged, as the ring 3 by reason of its section offers considerable resistance, and distributes the shock over a large surface of the rim. Cylindrically or spherically curved washers 27 may be used at the ends of the bolt 10' working in corresponding recesses, in order that the stresses on the bolt may always be in a straight line. The bearing surfaces 20 can also be open toward the outside so that the bolt can be swung out laterally, or they may be simply drilled so that the bolt can only be withdrawn axially after completely unscrewing one nut. The bearing surfaces 20 could be internally screw threaded to be engaged by threads on the bolt 10', in which case the ends of the ring would be forced apart on unscrewing the bolt. An oppositely screwed bolt and nut could also be used for the same purpose. Naturally this separation of the ends of the ring will usually be produced by the elasticity of the ring itself. 28 is a wedge-shaped filling piece.

As shown in Fig. 9 the mud-guard 1 is curved instead of being flat.

The mud-guard 1 is advantageously secured in the groove 2 of its supporting ring 3 by means of an expansible rod 29, for example a spiral spring. For this purpose a steel spiral spring 29 of which the ends are connected together is inclosed in the mudguard 1 of rubber-fabric. As the spring is as elastic as the rubber mud-guard 1, it permits of the mud-guard being passed over the edge 30 of the ring 3 into the groove 2 (Fig. 12). The length of the spring 29 forming a circle, is such that its diameter in the normal condition of the spring, is somewhat smaller than that of the groove 2, and that when applying the mud-guard this is tightened in the groove 2 by the spring. For connecting together the two ends of the spring 29 the end coils are separated by a distance equal to the diameter of the wire, and then the coils of one end of the spring which has been thus unwound, are screwed into the coils at the other end, so that for a certain length the two coils engage in one another, thus providing a connection which is as pliant and elastic both transversely and longitudinally as any other part of the spring.

In Fig. 11 the ends are cut off transversely, but preferably they are cut to a wedge-shape as at 31, so that they will wedge between the other coils, thus gradually spreading these apart.

The employment of the elastic ring 29 has the advantage that the mud-guard while being quite safely secured is easily removable and retains its elasticity indefinitely without being affected by exterior influences, as is the case when rubber alone is used. The continuous extensible ring or annular spring 29 may be replaced by two or more springs connected together by inextensible members without destroying either the elasticity of the strengthened part of the mud-guard or the firmness of the connection between the mud-guard and the metal ring.

Experience has shown that in the case of wheels of light vehicles, it is possible to omit the bolt 10 so as to make the metal ring lighter, to facilitate the mounting and removal of the mud-guard and also to improve the appearance (Fig. 13). In the disengaged condition, the two ends 8 and 9 of the ring overlap one another, or preferably are placed side by side (Fig. 14); one of the ends 8 is provided with a bolt 22ª which when fitting the parts together, engages freely with a hole 22ᵇ, suitably formed in the other end 9 (Fig. 15). In this manner the closure between the two ends is rendered practically invisible and the tightening of the ring 3 and consequently its clamping to the rim are practically insured by the elasticity of the metal ring and by the mud-guard 1, fitted with its strong spring 29, which close the ring and prevent it from being opened; it is even possible to omit the bolt 22ª and its hole, the two ends 8 and 9 simply coming face to face.

I am aware that tightening-rings have already been proposed in combination with detachable and movable rims and safety-wheels for motor-cars and I do not claim such devices broadly, their objects being absolutely different.

Having thus described my invention, what I claim as new and desire to secure by Letters Patent is:—

1. The combination with a wheel rim of an expansible and contractible splitted annular member, said member having an annular edge corresponding in shape to the edge of the rim with which it is adapted to engage circularly, means for circumferentially tightening the annular member on the wheel rim, a groove formed in said annular member, an annular disk-like mud-guard mounted in said groove, an extension rod-ring retaining the mud-guard in the groove, said rod-ring being embedded in the mud-guard during the vulcanization thereof.

2. The combination with a wheel rim and a tire held therein, of an expansible and contractible splitted annular member, said member having an annular hooked edge corresponding in shape to the hooked edge of the rim with which it is adapted to engage circularly so as to project laterally therefrom, means for circumferentially tightening the annular member on the wheel rim, a groove formed in said annular member, an annular disk-like mud-guard mounted in said groove and projecting freely outward toward the tread of the tire, an extensible rod ring retaining the mud-guard in the groove, said rod ring being embedded in the mud-guard during the vulcanization thereof.

3. The combination with a wheel rim of an expansible and contractible splitted annular member, said member having an annular edge corresponding in shape to the edge of the rim with which it is adapted to engage circularly, means for circumferentially tightening the annular member on the wheel rim, a groove formed in said annular member, an annular disk-like mud-guard mounted in said groove, a spiral spring-ring retaining the mud-guard in the groove, said spiral ring being embedded in the mud-guard during the vulcanization thereof.

4. The combination with a wheel rim of an expansible and contractible splitted annular member, said member having an annular hooked edge corresponding in shape to the hooked edge of the rim with which it is adapted to engage circularly and to project outwardly therefrom, means for circumferentially tightening the annular member on the wheel rim, a groove formed in said annular member, an annular disk-like mud-guard mounted in said groove and extending toward the tread of the tire mounted on said rim, said guard tapering toward its free edge, a spiral spring ring retaining the mud-guard in the groove, said spiral ring being embedded in the mud-guard during the vulcanization thereof.

5. The combination with a wheel rim; of an annular expansible and contractible member, means for circumferentially tightening the annular member on the wheel rim, a flange on said annular member, said flange being adapted to engage with the rim, a groove formed in said annular portion, the side of the member outside said groove being enlarged, a mud-guard mounted in said groove, a spiral spring ring retaining the mud-guard in the groove, said spiral spring ring being embedded in the mud-guard during the vulcanization thereof.

6. The combination with a wheel rim; of an expansible and contractible splitted annular member, said member having an annular edge corresponding in shape to the edge of the rim with which it is adapted to engage circularly, means for circumferentially tightening the annular member on the wheel rim, a groove formed in said annular member, an annular disk like mud-guard in said groove and an expansible rod-ring retaining the mud-guard in the groove.

7. The combination with a wheel rim; of an annular expansible and contractible member, means for circumferentially tightening the annular member on the wheel rim, a flange on said annular member, said flange being adapted to engage with the rim, a groove formed in said annular portion, a mud-guard mounted in said groove and having a portion thereof sprung into and serving to retain said mud-guard against displacement but permitting expansion and removal thereof.

8. The combination with a wheel rim of an expansible and contractible splitted metal ring, of essentially -like section, said ring having an annular interior hooked flange corresponding in shape to the hooked flange of the metal rim with which it is adapted to engage circularly, and an annular exterior groove, an annular disk-like mud-guard mounted in said groove, a strong spiral spring ring embedded in the mud-guard during the vulcanization thereof, the said spring ring retaining the mud-guard in the groove and simultaneously insuring the tightening of the splitted ring and its clamping to the rim.

In testimony whereof I have signed my name to this specification in the presence of two subscribing witnesses.

EDOUARD BRUNSWICK.

Witnesses:
BENJAMIN BLOCK,
HYLAIN FLOQUET.